No. 740,234. PATENTED SEPT. 29, 1903.
F. CLARKE.
TIME-CONTROLLING MECHANISM.
APPLICATION FILED JULY 24, 1903.
NO MODEL. 2 SHEETS—SHEET 1.

Witnesses.
Geo Fuery
Harry Davis

Inventor.
Frank Clarke

No. 740,234.  
Patented September 29, 1903.

UNITED STATES PATENT OFFICE.

FRANK CLARKE, OF BIRMINGHAM, ENGLAND.

TIME-CONTROLLING MECHANISM.

SPECIFICATION forming part of Letters Patent No. 740,234, dated September 29, 1903.

Application filed July 24, 1903. Serial No. 166,915. (No model.)

*To all whom it may concern:*

Be it known that I, FRANK CLARKE, manufacturer, a subject of the King of Great Britain, residing at 10 Gothic Arcade, Snow Hill, Birmingham, in the county of Warwick, England, have invented certain new and useful Improvements in a Time-Controlled Mechanism, of which the following is a specification.

My invention relates to time-controlled mechanism, it comprising, in combination with an ordinary alarm-clock, certain novel features rendering it particularly useful for automatically making at any desired time a cup of tea, coffee, or such like and for audibly indicating to the user that such tea or coffee has been made.

The said invention will be hereinafter described in detail with the aid of the accompanying sheets of drawings, upon which—

Figure 1:
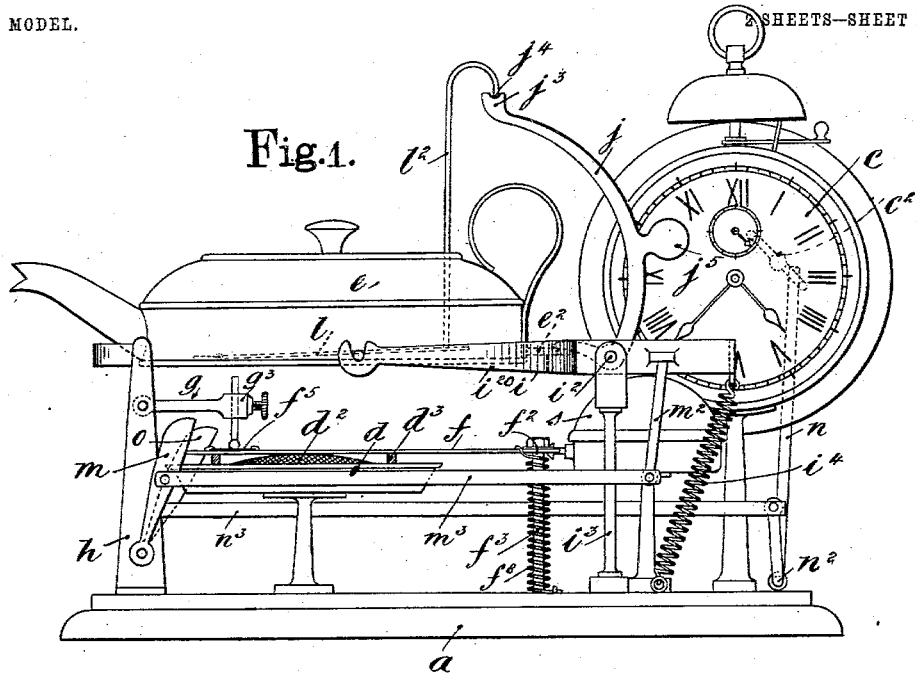
Figure 2:
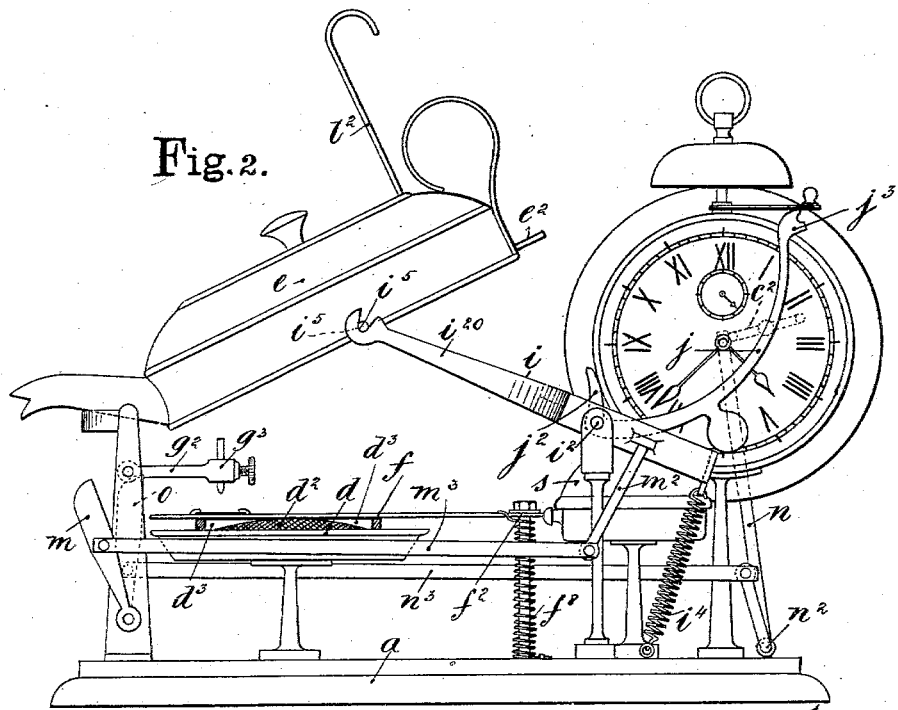
Figure 3:
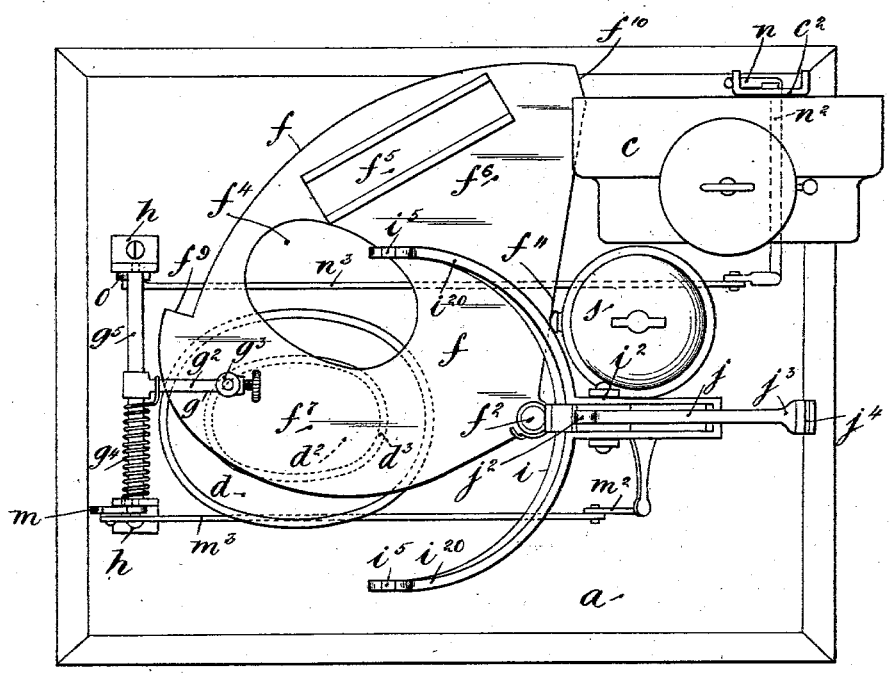

Figures 1 and 2 are elevations, and Fig 3 a plan. Fig. 1 shows the relative positions of the parts of the apparatus when set to automatically come into operation at a predetermined time governed by the running down of the alarm mechanism of the clock, while Fig. 2 shows the said relative positions after the liquid has boiled and has been poured. The plan Fig. 3 is of Fig. 2 with the liquid-boiling kettle removed from the apparatus.

The base of the apparatus is a flat rectangular-shaped table $a$ of suitable size to carry upon it the whole of the parts of the said apparatus. A suitable alarm-clock $c$ is rigidly attached to the table $a$ at one corner, the winding-key of the alarm mechanism thereof being represented at $c^2$.

A spirit-lamp $d$ is rigidly supported on the table $a$, so as to be underneath a liquid-boiling kettle $e$, the burner $d^2$ of this lamp having a rim $d^3$ surrounding it and rising just above it. Provided over this lamp, so as to be between it and the kettle $e$, is a spring-operated shutter $f$, pivoted at $f^2$ to a pillar $f^3$, rising rigidly from the table $a$ and arranged so as to move across the top of the lamp quite close (preferably in light contact) to the upper edge of the rim $d^3$. This shutter, which has within it an opening $f^4$ and upon it a match-striker (glass-paper) $f^5$ operates, so that at one time the part $f^6$ of it closely covers the burner of the lamp and prevents evaporation of the spirit and at another time exposes by way of the opening $f^4$ the burner, so that the lamp may be lighted and may burn, and at a further time the part $f^7$ of it closes over the burner to extinguish the lamp, this latter taking place after the liquid has been boiled and poured. The lamp burns methylated spirit, and therefore if charged requires to be closely covered when not in use in order to save waste, it being understood that the apparatus is set to automatically operate some hours later. The spring $f^8$ for operating the shutter only moves the said shutter across the lamp in one direction, the movement in the other direction (the recrossing) being brought about by hand when setting the apparatus. Above the shutter $f$ is provided a match-carrier $g$. This match-carrier is adapted to hold a match in contact with the striker $f^5$ while the said shutter moves across the lamp, thereby igniting the said match and when the opening $f^4$ is coincident with the burner lighting the lamp. The match-carrier comprises a rocking arm $g^2$ with a socket $g^3$ at the end of it, and a spring $g^4$ to gently press the said socket toward the striker $f^5$, the said arm being rigidly carried upon a bar $g^5$, turning in bearings of two brackets $h\ h$, rising rigidly from the table $a$. The match is simply clamped in the socket $g^3$, and the spring $g^4$ presses it into contact with the striker.

The liquid-boiling kettle $e$ is supported upon the table $a$ in a position over the lamp by a lever-like rocking frame $i$, pivoted at $i^2$ to a pillar-support $i^3$, rising rigidly from the base $a$. This frame $i$ is bifurcated or forked at $i^2$ to embrace the diameter of the kettle and is provided with a spring $i^4$ to rock it when it is released from the position Fig. 1 to the position Fig. 2, which helps the tipping of the kettle $e$ for pouring and which effects the release of the shutter $f$ in the manner and for the purpose hereinafter described. The kettle $e$ is pivotally carried upon the frame $i$ at $i^5\ i^5$ out of center, its tendency when full of liquid being always to tip for pouring. Its weight when full of liquid is approximately sufficient to sustain it in its horizontal position, as represented by Fig. 1—viz., against the action of the spring $i^4$. The kettle $e$ when the apparatus is set for operation, as in Fig. 1, is prevented from automatically tipping by an arm $j$, which operates to engage a projection $e^2$ on the said kettle, the said engagement being by a foot $j^2$ upon the inner end of the said arm. The arm swings on the pivot-pin $i^2$ of the rocking frame $i$, and when holding the kettle horizontal, as in Fig. 1, its upper end $j^3$ is engaged by a link $l^2$, carried rigidly upon a hinged flap $l$, rendered movable within the interior of the kettle $e$, this hinged flap, jointed at $l^3$, being operated by the action of the liquid in the interior of the kettle. A notch $j^4$ is provided on the extremity of the upper end $j^3$ of the arm $j$, with which the end $l^2$ of the link is adapted to engage. It will be seen that when the kettle is full of liquid there is a weight of water above the hinged flap $l$, which serves to hold the arm $j$ in a position as in Fig. 1. When the water in the kettle boils, the flap $l$ is lifted by the boiling action, which has the effect of removing the link out of engagement with the notch $a^4$. The arm $j$ may be weighted at $j^5$, if necessary.

Connected with the short arm of the lever-like frame $i$ by means of links $m^2 m^3$ is a catch $m$, which swings upon one of the brackets $h$. This catch is moved into and out of engagement with a part $f^9$ of the shutter $f$ by the rocking movement of the kettle-carrying frame $i$, the said catch being adapted to hold the shutter $f$ with its opening $f^4$ coincident with the burner of the spirit-lamp while the lamp is burning and the kettle being boiled. When the rocking frame $i$ moves into the position shown in Fig. 2, the catch $m$ is by the spring $i^4$ moved out of engagement with the part $f^9$, so as to allow the part $f^7$ of the shutter $f$ to automatically (by the spring $f^8$) move over the lamp-burner to extinguish the said lamp.

Pivoted to the table $a$ at $n^2$ is a lever $n$, which is adapted to be operated by the winding-key $c^2$ of the alarm mechanism of the clock and to operate a catch $o$, hinged to one of the brackets $h$, to engage a part $f^{10}$ of the shutter $f$. The catch $o$ is connected to the lever $n$ by a link $n^3$. The one end of the lever $n$ when the apparatus is set, as in Fig. 1, rests against the winding-key $c^2$ of the alarm-operating mechanism and is struck by this key when the alarm goes off and the alarm mechanism runs down. In the setting of the apparatus the shutter $f$ is held against the action of its spring $f^8$ by the catch $o$, so that the part $f^6$ of it closely covers the burner of the lamp. An audible signal—a bell $s$—is provided upon the table $a$ to be automatically rung after the kettle has boiled and the liquid has been poured, this bell being put into operation by the edge $f^{11}$ of the shutter $f$ contacting a releasing-piece of the said bell after the said shutter has extinguished the lamp.

The working of the apparatus is as follows: The spirit-lamp is charged, the alarm mechanism is wound up and set, the shutter $f$ is moved into a position to be held by the catch $o$, which brings the lever $n$ to contact the winding-key $c^2$ of the alarm mechanism, a match is clamped in the match-carrier to touch the striker, and the kettle is filled and placed upon the frame $i$, with the part of its hinged flap $l$ engaging the arm $j$, the positions of the parts being as in Fig. 1, the catch $m$, although not engaging the part $f^9$ of the shutter, being in the path of the said part as the shutter moves across the lamp. When the parts are in these positions, the springs $f^8$, $g^4$, and $i^4$ are in tension. Now immediately the alarm mechanism of the clock operates or goes off the lever $n$ is rocked to move the catch $o$ from holding the shutter $f$, when the said shutter immediately flies over to uncover the lamp-burner and to strike the match, which is always opposite the lamp-burner, and to be held by the catch $m$ with its opening $f^4$ coincident with the said lamp-burner. The parts of the apparatus now remain in the position they have now assumed until the kettle begins to boil, when immediately the hinged flap $l$ operates to free the arm $j$ so that it may release the kettle, which automatically tips to start pouring, the frame $i$ as the kettle gradually empties being rocked by the spring $i^4$, the catch $m$ being moved clear of the shutter $f$, which now completes its movement across the lamp to extinguish the latter and sound the indicating-bell $s$.

In connection with the apparatus as aforesaid a cup or container is used to receive the liquid when it is automatically poured.

It will be seen that the action of the apparatus is set going from the alarm mechanism of the clock.

Having now described my invention, what I claim, and desire to secure by Letters Patent, is—

1. A time-controlled mechanism comprising an alarm-clock, a spirit-lamp, a kettle to hold the liquid, spring-operated devices to support the kettle over the said lamp, a shutter-spring operated to close and open the lamp, a match-carrier provided opposite the burner of the lamp, means for striking the match when the shutter moves, and devices operated from the clock and from the kettle-support to hold and release the shutter, substantially as described.

2. A time-controlled mechanism comprising an alarm-clock, a spirit-lamp provided with a rim to surround it and rise just above it, a kettle to hold the liquid, spring-operated devices to support the kettle over the lamp, a spring-operated shutter to close and open lamp, this shutter being provided with an opening and working against the rim of the lamp, a match-carrier arranged opposite the lamp-burner, means for striking the match when the shutter moves, and devices operated from the clock and from the kettle-support to hold and release the shutter.

3. A time-controlled mechanism comprising an alarm-clock, a spirit-lamp having a surrounding rim, a kettle to hold liquid, a spring-operated rocking frame to support the kettle over the lamp, means for holding the kettle horizontal on rocking frame said means comprising a piece movable in the interior of the kettle when the water boils, a spring-operated shutter to close and open the lamp the said shutter working against the rim of lamp, a match-carrier arranged opposite the lamp-burner, means for striking the match when the shutter moves, and devices operated from the clock and kettle-support to hold and release the shutter.

4. A time-controlled mechanism comprising an alarm-clock a spirit-lamp, a kettle, and spring-operated means for supporting the kettle over the lamp, a shutter for opening and closing the lamp, a match holder and striker automatically coming into action when the shutter moves, a hinged flap in the interior of the kettle, and a catch to hold and release shutter said catch being operated from the clock and from said hinged flap, substantially as described.

5. A time-controlled mechanism comprising an alarm-clock, a spirit-lamp, a kettle to hold the liquid, spring-operated devices to support the kettle over the said lamp, a shutter, spring-operated to close and open the lamp, a match-carrier provided opposite the burner of lamp, means for striking the match when the shutter moves, devices operated from the clock and from the kettle-support to hold and release the shutter, and an audible signal brought into operation by the shutter as the boiled liquid is poured substantially as described.

In testimony whereof I have hereunto set my hand in presence of two subscribing witnesses.

FRANK CLARKE.

Witnesses:
GEO. FUERY,
HARRY DAVIS.